T. BERLIZE.
INTERNAL COMBUSTION ENGINE.
APPLICATION FILED JUNE 23, 1914.
1,201,678.
Patented Oct. 17, 1916.
4 SHEETS—SHEET 4.
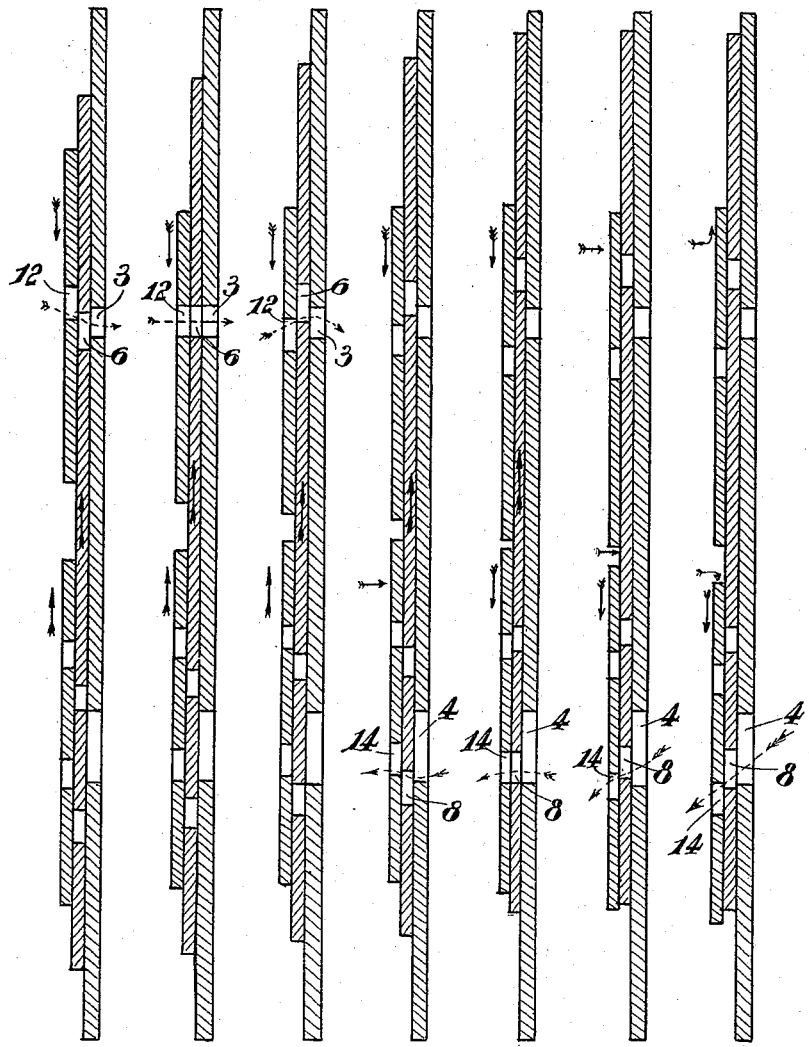
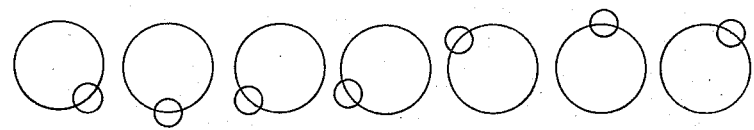
Fig.10. Fig.11. Fig.12. Fig.13. Fig.14. Fig.15. Fig.16.
WITNESSES:
John C. Sanders
Albert F. Heuman
INVENTOR:
Theophile Berlize
BY Mr. Wallace White
ATT'Y.

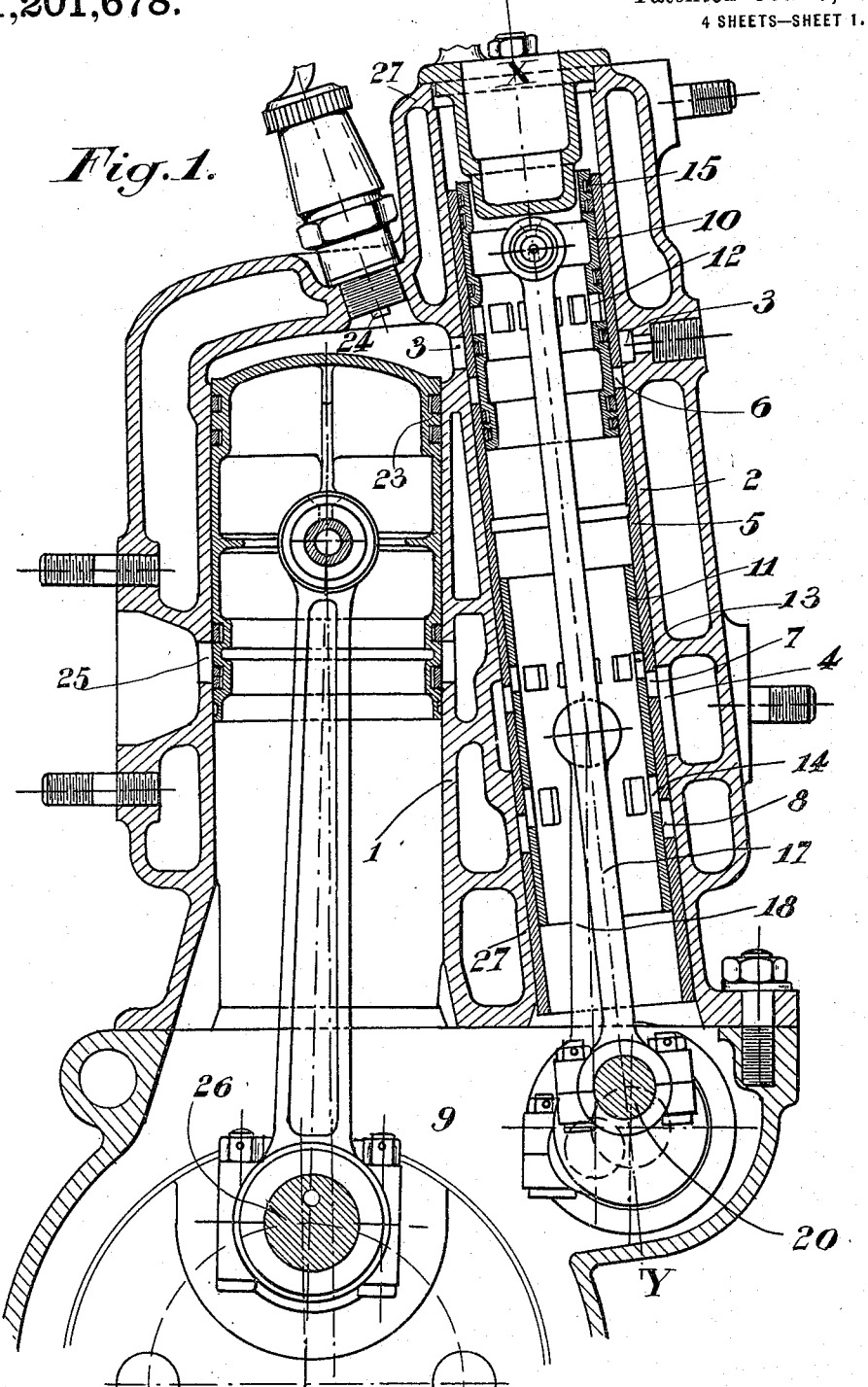

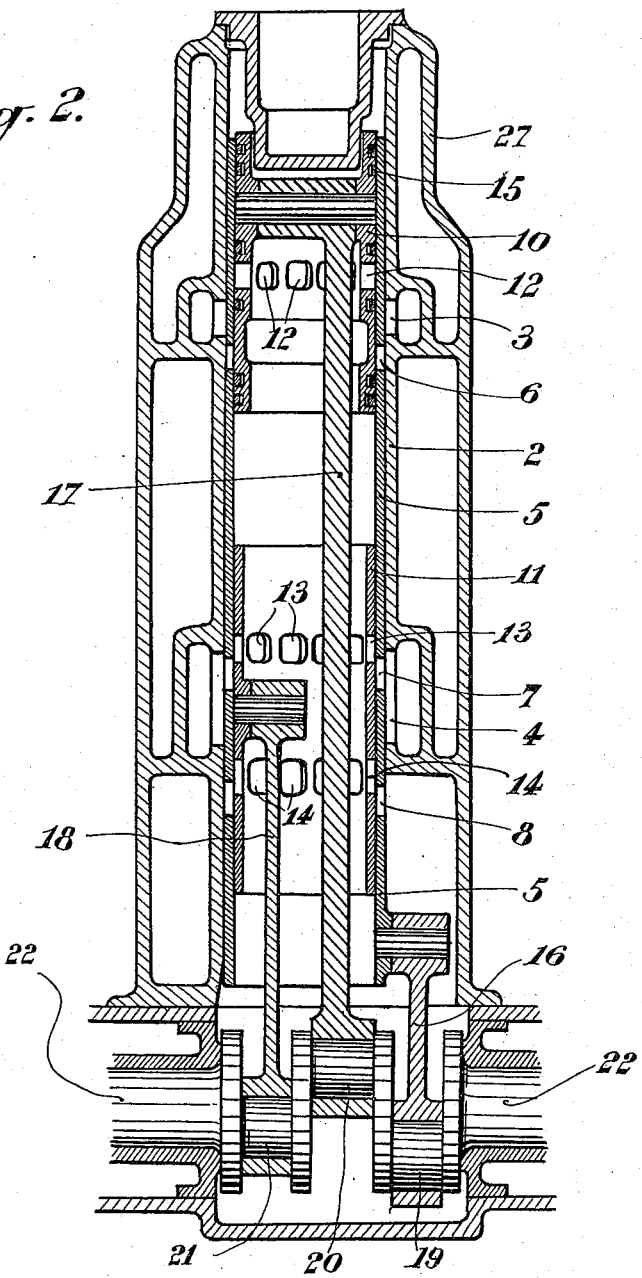

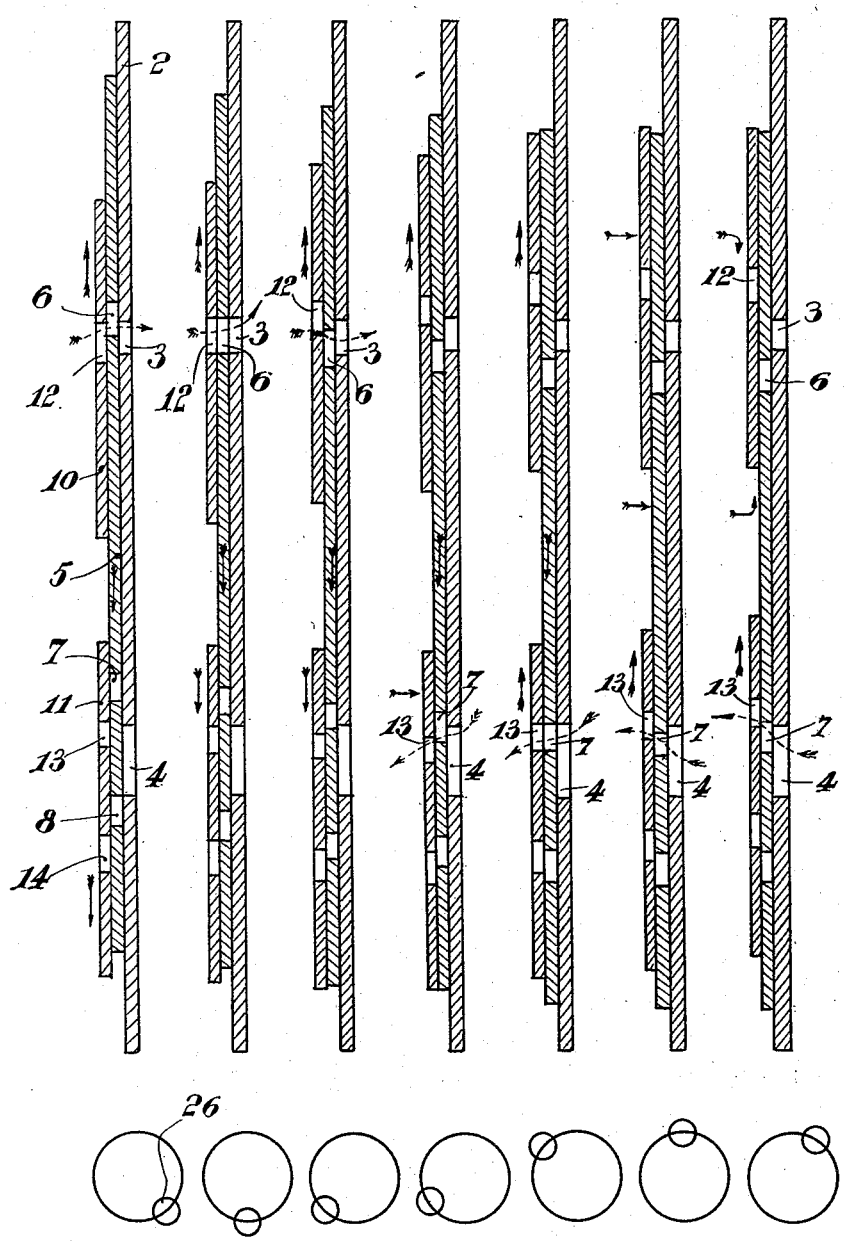

UNITED STATES PATENT OFFICE.

THEOPHILE BERLIZE, OF BRUSSELS, BELGIUM, ASSIGNOR TO SOCIÉTÉ LE MOTEUR BERLIZE, OF ANTWERP, BELGIUM, A CORPORATION OF BELGIUM.

INTERNAL-COMBUSTION ENGINE.

1,201,678.      Specification of Letters Patent.      Patented Oct. 17, 1916.

Application filed June 23, 1914. Serial No. 846,742.

*To all whom it may concern:*

Be it known that I, THEOPHILE BERLIZE, citizen of Belgium, residing at Brussels, Belgium, have invented certain new and useful Improvements in Internal-Combustion Engines, of which the following is a specification.

This invention relates to a distribution mechanism comprising reciprocating sleeves especially applicable to two-stroke cycle internal combustion engines.

In the majority of two stroke cycle internal combustion or explosion engines the inlet and exhaust ports are formed in the cylinder very nearly at the same level and the piston, which acts as the valve, carries a guide web called a deflector, the function of which is to guide the fresh gases toward the top of the cylinder while the burnt gases escape at the bottom. This arrangement gives rise to losses of fresh gas which become the more considerable the greater the reduction of the speed of the engine. It is therefore desirable that the inlet and exhaust shall take place at opposite ends of the cylinder, which necessitates the use of a positively operated valve for the inlet. The application of inlet valves to two stroke cycle internal combustion engines presents however very serious difficulties, owing to the short duration of the period of admission which takes place during the moment in which the piston is at the end of its downward stroke, and also owing to the impossibility of avoiding stratification of the gases admitted. Furthermore at high speeds, the valves are subjected to disturbances in working, to racing, to shocks and breakages.

The slide valves proposed hitherto, for two stroke cycle internal combustion engines do not effect the desired purpose in a satisfactory manner. In particular a rotary valve which by the fact of its rotation alone is in contact with the burning gases over a great part of its circumference, wears out rapidly and quickly gives rise to leakages. On the other hand in a valve with a reciprocating movement it is difficult to prevent the forces of inertia from becoming unduly great when high speeds are reached. Furthermore the difficulties are increased in all cases owing to the fact that in a two stroke cycle engine, there are two admissions for each revolution of the driving crank, one in the pump body which is generally constituted by the crank casing, and the other in the cylinder, the inlet ports being compelled to open rapidly over a large area. These numerous difficulties are overcome by distribution mechanism according to this invention, which is located at one side of the cylinder and operated by a shaft which rotates at half the speed of the driving shaft. This slowly running distribution shaft operates slide valves which are preferably in the form of concentric sleeves and provide for two admissions per revolution of the driving shaft, namely one admission to the pump body and one admission to the cylinder.

Generally the distribution mechanism is located in a tubular casing attached to or formed in one with the cylinder and forming an extension of the pump body that is constituted by the crank casing. This extension communicates, through suitable ports, on the one hand with the cylinder and on the other hand with the gas supply pipe and within it is arranged to work a slide valve or main sleeve formed with openings corresponding to these ports. Arranged to slide in the main sleeve, opposite the inlet ports to the cylinder, and crank casing respectively, are two auxiliary or expansion sleeves, the three sliding sleeves being operated separately by the valve shaft. The valve arrangement may be placed either vertically, horizontally or obliquely.

Figure 1 of the accompanying illustrative drawings, shows in vertical section a two-stroke cycle internal combustion engine embodying the invention. Fig. 2 is a vertical section corresponding to the line X—Y of Fig. 1. Figs. 3 to 16 represent the relative positions of the valve members during one complete revolution of the valve shaft, that is to say during two consecutive revolutions of the driving shaft.

Fixed to or formed in one with the cylinder 1 of the engine is a tubular casing 2 formed with two rows of ports of which those marked, 3, 3 communicate at all times with the upper part of the cylinder and those marked 4, 4 with the supply pipe for the combustible gases. Mounted to slide in the casing 2 is a main cylindrical slide valve or sleeve 5 formed near its upper end with a row of ports 6, 6 serving for the admission of the fresh gases to the motor cylinder, and near the bottom formed with two superposed rows of ports 7, 7 and 8, 8 which serve alternately for the admission of fresh gases to the crank casing 9 which, in the example under notice, constitutes a pump body into which the explosive mixture is drawn and slightly compressed prior to its introduction into the cylinder.

Mounted to slide within the sleeves 5 are two expansion slide valves or sleeves 10 and 11. The upper sleeve 10 is formed with a row of ports 12, 12 which are adapted to coincide with the ports 6, 6 in the sleeve 5, while the lower sleeve 11 is formed with two rows of ports 13, 13 and 14, 14 which are respectively adapted to coincide with the ports 7, 7 and 8, 8 of the sleeve 5. The different sleeves are provided with packing rings 15 at suitable points. The three sleeves 5, 10 and 11 are operated through connecting rods 16, 17 and 18 and cranks 19, 20 and 21 by the valve shaft 22 which rotates at a speed which is half that of the driving shaft. The relative positions in which the cranks 19, 20 and 21 are fixed are determined in such a manner as to give the desired duration to the periods of admission. In the example illustrated, the crank 19 of the main sleeve 5 is fixed at an angle of 180° to the crank 20 of the upper sleeve 10 and at an angle of 60° to the crank 21 of the lower sleeve 11.

The gases admitted to the crank casing, through the ports 4 and openings 7 and 13 or 8 and 14, are compressed by the piston 23 of the motor, then admitted to the cylinder 1 near the sparking plug 24 through the openings 12 and 6 and the ports 3. The burnt gases from the previous explosion are swept out through an exhaust port 25 which the piston 23 uncovers. Throughout their course the gases therefore come in contact with the passages of large area only which give rise neither to eddies or losses in the charge and insure a liberal supply to the cylinder even at very high speeds.

The positions of the slide valves 5, 10 and 11 relatively to the casing 2 during one complete revolution of the valve shaft and corresponding to two revolutions of the driving crank 26, are shown diagrammatically in Figs. 3 to 16 the lower parts of which show the corresponding positions of the driving crank 26. The arrows in full lines indicate the direction of movement of the slide valves, while the arrows in dotted lines indicate the directions of the currents of gas admitted.

It will be seen that the admission of the gases to the cylinder takes place at the moment in which the piston 23 is at the end of its downward stroke, while the main slide valve 5 and the expansion slide valve 10 are at the middle of their strokes, that is to say at the moment in which the speed of these valves is the greatest. The admission of the gases to the crank casing pump body takes place when the admission of the fresh gases to the cylinder is complete. It commences during the upward stroke of the piston 23, continues throughout the duration thereof and only ceases when the piston commences to descend again, as shown in Figs. 9 and 16. It will also be seen that the upper openings 7 and 13 and the lower openings 8 and 14 which are brought in succession opposite the ports 4, serve alternately for the admission of the gases to the crank casing pump body. It is not indispensable to thus distribute the inlet openings in the valve in two rows which are alternately in use but this arrangement permits of advantageous values being given to the inlet ports and to the strokes of the slide valves. Furthermore, although in the drawing the expansion sleeves are placed inside the principal sleeve, they may obviously surround it in some constructions.

The cooling of the distribution mechanism is insured in a very efficacious manner, externally by a water jacket 27 surrounding the casing 2, and internally by the inrush of the fresh gases. Furthermore it is only the very small part of the outer sleeve 5 bounded by the ports 4 which is exposed to the high temperature of the cylinder. The fresh gases being admitted at the end opposite to the exhaust ports for the burnt gases, are completely separated from the residues of combustion which they sweep out before them. They are also admitted close to the igniting apparatus and, at the moment of explosion the latter is in the center of a readily inflammable mixture whatever the volume of gas admitted may be. Finally it is important to state that the speed of the reciprocating sleeves is much less than that of the piston, so that there are only feeble forces of inertia in action and the working of the motor is remarkably regular and silent. Since these sleeves or slide valves are well balanced, are not subjected to any lateral strain and are not exposed to high temperatures, the distribution mechanism is only subjected to a negligible amount of wear and may be used for a very long time. If the rows of openings in the distribution mechanism are duplicated, a single mechanism can be used in connection with two cylinders the cranks of which are keyed at 180° from each other or two oppositely arranged cylinders and the pump bodies of the same.

The hereinbefore described distribution mechanism may obviously be applied to any two stroke cycle internal combustion engine and the previous compression of the gases may also be effected in a chamber independent of the crank casing instead of therein.

What I claim as new and desire to secure by Letters Patent, is:—

1. A two stroke cycle internal combustion engine, comprising the combination with the cylinder of the engine having a crank case serving as a pump body; of superimposed slide valves exteriorly of the cylinder for controlling both the admission of the gases to the pump body and the admission to the cylinder, a driving shaft for the motor and a shaft rotating at one half the speed of the driving shaft for operating said slide valves.

2. In a two stroke cycle internal combustion engine, a cylinder having a pump body, a piston working in said cylinder, a driving shaft connected with the piston, a casing forming an extension of the pump body and connected to both the cylinder and the gas supply pipe, a main slide valve controlling both the admission of the gases to the pump body and the admission to the cylinder, an auxiliary slide valve for each of the said two admissions and a shaft rotating at one half the speed of the driving shaft operating said slide valves.

3. In a two stroke cycle internal combustion engine, a cylinder having a gas supply pipe, and a pump body, a casing forming an extension of the pump body and connected to both the cylinder and the gas supply pipe, a driving shaft, a piston in the cylinder connected with the driving shaft, a main slide valve controlling both the admission of the gases to the pump body and the admission to the cylinder, an auxiliary slide valve for each of the said two admissions, a distribution shaft rotating at one half of the speed of the driving shaft and cranks keyed on said distribution shaft for operating separately said slide valves, the relative positions of the cranks being such that the admission of the gases to the cylinder takes place when the principal slide valve and the auxiliary valve for the admission to the cylinder are at the middle of their strokes.

4. In a two stroke cycle internal combustion engine, a pump body, a tubular casing forming an extension of the pump body, a cylinder having a gas supply pipe, said casing being connected to both the cylinder and the gas supply pipe, a principal sliding sleeve within said casing controlling both the admission of the gases to the pump body and the admission to the cylinder, an auxiliary sliding sleeve within said principal sleeve for each of the said two admissions, a driving shaft for the engine and a shaft rotating at one half the speed of the driving shaft for operating said sliding sleeves.

5. In a two stroke cycle internal combustion engine, a cylinder having a crank casing and a gas supply pipe, a tubular casing forming an extension of the crank casing and connected to both the cylinder and the gas supply pipe, a principal sliding sleeve provided with one row of apertures for controlling the admission of the gases to the cylinder and two rows of apertures serving alternately for the admission to the crank casing, an auxiliary sliding sleeve provided with one row of apertures for the admission to the cylinder, another auxiliary sliding sleeve provided with two rows of apertures serving alternately for the admission to the crank casing a driving shaft and a shaft rotating at one half the speed of the driving shaft of the engine for operating said sliding sleeves.

6. A two stroke cycle internal combustion engine comprising in combination a cylinder having inlet and outlet ports placed at opposite ends thereof, a piston uncovering the outlet ports at the end of its outward stroke, a pump body for sucking in and compressing the gases prior to their introduction into the cylinder, a gas supply pipe, a distribution casing forming an extension of said pump body and connected to both the cylinder and the gas supply pipe, superimposed slide valves within said casing for controlling both the admission of the gases to the pump body and the admission to the cylinder a driving shaft and a shaft rotating at one half the speed of the driving shaft for operating said slide valves.

7. A two stroke cycle internal combustion engine comprising in combination a cylinder, a piston, an ignition device, inlet ports in said cylinder in proximity of said ignition device, outlet ports in said cylinder adapted to be uncovered by the piston at the end of its outward stroke, a crank casing forming a pump body, a distribution casing forming an extension of the crank casing, a principal slide valve within said distribution casing controlling both the admission of the gases to the crank casing and the admission to the cylinder, an auxiliary slide valve for each of the said two admissions a driving shaft and a shaft rotating at one half the speed of the driving shaft for operating said slide valves.

In testimony whereof I have affixed my signature in presence of two witnesses.

THEOPHILE BERLIZE.

Witnesses:
HENRY W. PLUEKER,
CHAS. ROY NASMITH.

Copies of this patent may be obtained for five cents each, by addressing the "Commissioner of Patents. Washington, D. C."